United States Patent [19]

Kowalewski et al.

[11] Patent Number: 5,582,569
[45] Date of Patent: Dec. 10, 1996

[54] SHAFT MOUNTING AND DRIVE FOR CARTON BLANK PROCESSING MACHINE

[75] Inventors: James M. Kowalewski, Baltimore; Solomon D. Kaplan, Owings Mills, both of Md.

[73] Assignee: Ward Holding Company, Inc., Wilmington, Del.

[21] Appl. No.: 202,424

[22] Filed: Feb. 28, 1994

[51] Int. Cl.$^6$ ................................................ B31B 1/00
[52] U.S. Cl. ............................ 493/52; 493/34; 493/471; 493/475
[58] Field of Search ........................... 493/34, 52, 468, 493/471, 475

[56] References Cited

U.S. PATENT DOCUMENTS

| | | | |
|---|---|---|---|
| 3,884,129 | 5/1975 | Monahan | 493/203 |
| 4,205,596 | 6/1980 | Chestnut | 493/370 |
| 4,736,660 | 7/1988 | Benach et al. | 83/174 |

OTHER PUBLICATIONS

"1 MB Digital Intelligent AC Main drives with frameless spindle motors", Indramat/Germany Dated Nov. 1991.

Primary Examiner—D. S. Meislin
Assistant Examiner—Eileen P. Morgan
Attorney, Agent, or Firm—Bartlett & Sherer

[57] ABSTRACT

A carton blank processing machine is disclosed having rolls for printing, cutting, creasing and otherwise processing carton blanks. The processing rolls are driven by shafts extending into bearings supported by spaced-apart frame members. At least one shaft extends through its associated bearing to the outboard side of the frame member and is surrounded by a motor, preferably of the frameless type, having a hollow rotor in which the shaft is received and connected for direct drive by the rotor. Axial adjustment systems are provided for axially adjusting at least one shaft and roll, and such systems may be mounted on the outboard end of the frameless motor.

9 Claims, 4 Drawing Sheets

SHAFT MOUNTING AND DRIVE FOR CARTON BLANK PROCESSING MACHINE

FIELD OF THE INVENTION

This invention relates to machines for printing, cutting and otherwise processing carton blanks, which may be composed of paperboard, corrugated stock or other materials, and more particularly to driving the shafts of the various rolls of such machines with direct drive motors while providing for axial adjustment of such motor-driven shafts.

BACKGROUND

Machines for printing, cutting, creasing and otherwise processing flat carton blanks, including those used for flexographic printing, commonly include a plurality of interacting rolls such as print rolls, impression rolls, die rolls and anvil rolls. Some rolls, such as the print roll and the die roll must be axially adjusted in the initial set up of the machine, while other rolls such as the anvil roll must be constantly adjusted axially in order to reduce wear from the die roll. In the case of print and die rolls, the requirement is to initially set and thereafter maintain the rolls in precise axial alignment so that the printed images will be sharp and clear on each of the hundreds or thousands of blank cartons imprinted by the machine. In the case of the anvil rolls, the need is to be able to constantly adjust the axial position of the anvil roll of each cooperating pair so as to distribute the wear of the cutter dies along the axial length of the anvil roll.

This problem of axial alignment of such processing machine rolls is compounded by the fact that such rolls are many feet in axial length, frequently weigh thousands of pounds and must be driven through drive shafts and multiple gears by electric motors mounted outside the machine frame. In typical carton blank processing machines, the die roll may be driven directly by a first, main motor while the anvil roll is driven through a variable speed gear system comprising several gears, a register and a trim motor; all of such motors and gearing being positioned at the end of the roll shafts extending outboard of the machine frame. In addition, a hydraulic motor must be mounted on the opposite end of the anvil roll shaft in order to axially adjust the position of the anvil roll relative to the die roll.

While the foregoing multiple-motor and multiple-gear system is effective in driving the various rolls at the desired relative speeds, and in constantly adjusting the axial position of the anvil roll, it is apparent that these systems are complex, and the requirement for four or more gears introduces an undesirable amount of backlash between the gears. Such unavoidable backlash prevents maintaining such precise angular relationship between the cooperating rolls as is desired. Also, such multiple gears require a substantial amount of costly assembly time, and subsequent maintenance time, as well as making trouble-shooting and diagnostic efforts much more difficult. Even though each gear of the complex, multiple gear system is manufactured to extremely high tolerances, a certain amount of backlash and inaccuracy cannot be avoided. Therefore, there has long been a need for a simpler and more accurate motor-drive system for driving large carton blank processing rolls, while at the same time, providing for initial axial adjustment and continuous axial adjustment as briefly explained above.

SUMMARY

The present invention solves the above-indicated need by mounting one or more motors, preferably of the so-called "frameless" or "partial" electric type, directly on the outer surface of the machine frame, and direct coupling the rotor of one or more of such motors to one or more roll drive shafts, with the drive shafts extending axially through the motor, and mounting axial adjustment systems on selected drive shafts extending through the motors.

In this manner, all previously required gearing is eliminated, as well as the need for trim motors. As a result, the previous problem of backlash between gears is eliminated and the accuracy of the relative angular positions of the rolls is substantially increased. These and other objects and advantages will become apparent from the following description of several preferred embodiments of the invention. The invention will be described, by way of illustration and example, in connection with the printing, cutting and processing of flat, carton blanks. Such carton blanks are typically composed of such materials as paperboard, cardboard or corrugated stock, and the machines are hereinafter referred to as carton blank processing machines.

In general, the present invention includes a pair of spaced, vertical frame members supporting a plurality of bearings in which the drive shafts of the rolls are journaled, and in which at least one of the drive shafts extends through one of the bearings to the outboard side of the frame member, and in which a motor with a hollow rotor is mounted on the outboard side of the frame member surrounding the drive shaft, and coupling means directly connect the hollow rotor to the drive shaft whereby the drive shaft and roll is rotated directly by the motor without any intermediate gearing.

DETAILED DESCRIPTION OF PREFERRED EMBODIMENTS

Figure 1:
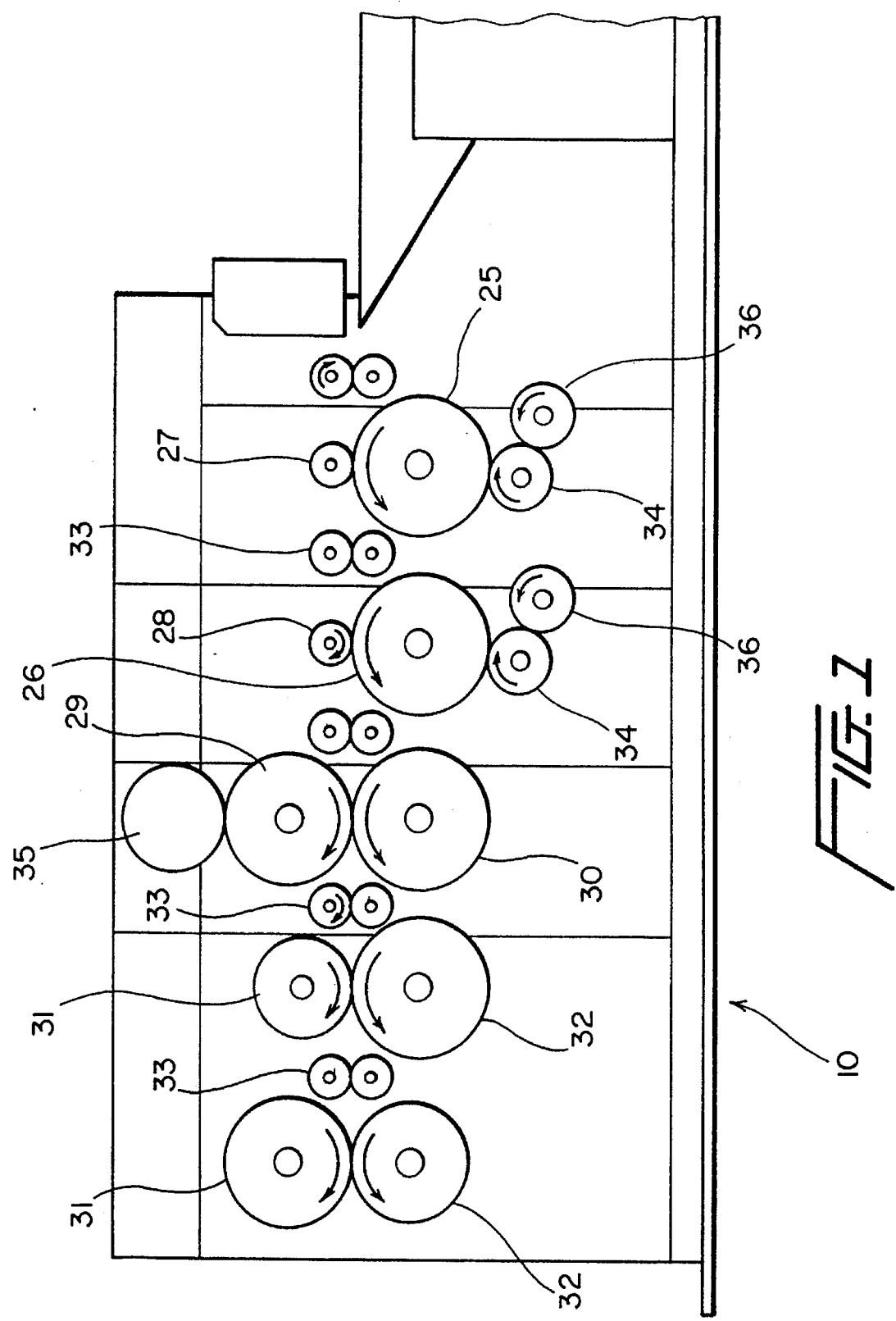
FIG. 1 is a simplified, diagrammatic, side elevational view of a carton blank processing machine illustrating a typical arrangement of the different types of rolls which are driven and axially adjusted by the present invention.

As shown in FIG. 1, a carton blank processing machine 10 is illustrated as comprising a pair of spaced, vertically extending frame members 12 (only the front member being visible) which support nine large processing rolls such as, for example, first and second print rolls 25, 26 which cooperate with corresponding impression rolls 27, 28, as well as at least one die cutter roll 29 with associated anvil roll 30, and two or more creaser and/or slotter rolls 31 together with their respective backing rolls 32. A typical carton blank processing machine also includes a large plurality of other types of rolls such as a stripper roll 35, multiple pairs of nip rolls 33 for advancing the carton blanks through the machine, and one or more ink or anilox rolls 34 and associated wiper rolls 36, all of which rolls may be driven in the same manner as that which will be described, by way of example only, with reference to the typical die roll 29 and anvil roll 30 illustrated in FIG. 2.

Figure 2:
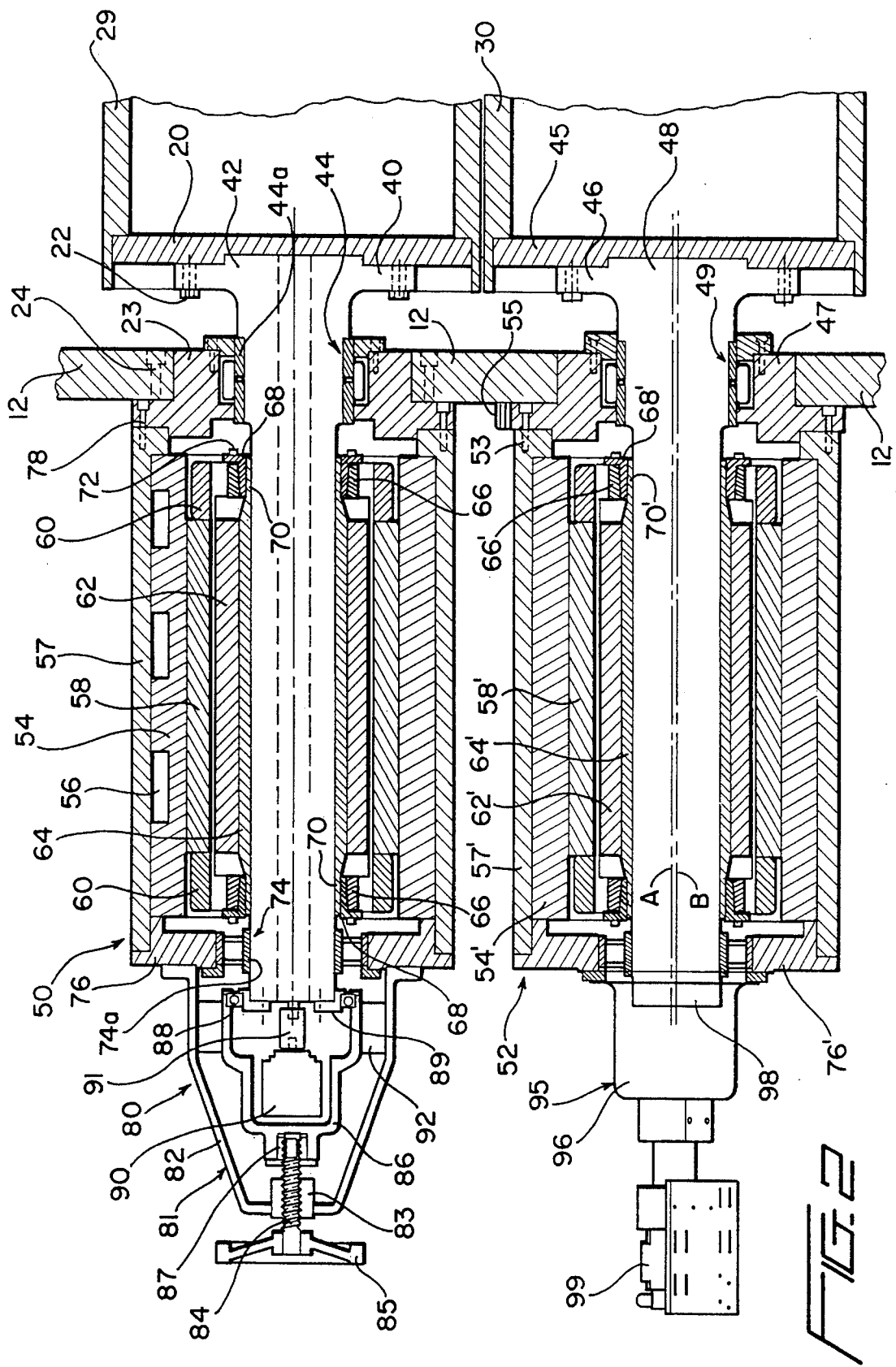
FIG. 2 is a simplified, partial side view showing one pair of die and anvil rolls with a frameless motor mounted on the outboard end of each roll drive shaft, and showing alternative axial adjustment systems mounted outboard of the frameless motors.

Referring to FIG. 2, numeral 12 represents the left wall or frame member of a pair of horizontally spaced frame members. The left end of a die roll 29 is secured to an end plate 20 which is bolted by bolts 22 to a circular flange 40 of a drive shaft 42. Shaft 42 extends through a bearing 44 which is secured in a bearing housing 23; bearing housing 23 being retained in frame member 12 by bolts 24. In a similar manner, the left end of anvil roll 30 is secured to an end plate 45 which is bolted to circular flange 46 of a drive shaft 48. Shaft 48 extends through bearing 49 which is secured in an adjustable, eccentric bearing housing 47 supported in frame member 12.

Each of drive shafts 42 and 48 extend through a respective electric motor 50, 52 in a similar manner such that it will be understood that a description of the relationship of shaft 42 and motor 50 also applies to shaft 48 and motor 52.

Motor 50 is preferably of the frameless type and comprises an annular cooling jacket 54 including water or air cooling fluid passages 56 sealed by a cooling jacket sleeve 57. Alternatively, motor 50 may be externally cooled, and conventional fluid seals have been omitted for clarity. Jacket 54 surrounds a stator 58 having field windings 60 shown at opposite ends of the motor. Stator 58 surrounds a hollow rotor 62 which is secured, as by bonding, shrink-fitting or hydraulic coupling, to a hollow rotor sleeve 64. It will be noted that drive shaft 42 extends through the entire axial length of sleeve 64 of hollow rotor 62.

Sleeve 64 may be connected to drive shaft 42 in a number of ways. As illustrated, for purposes of example only, a pair of annular rings 66 are positioned around each end of sleeve 64, and a pair of tapered wedge rings 68 are force-fitted between annular rings 66 and the exterior surface of reduced diameter portions 70 of sleeve 64. Wedge rings 68 may be forced into secure engagement between annular rings 66 and sleeve portions 70 by a plurality of bolts 72 extending into annular rings 66 so that sleeve portions 70 are forced radially inwardly in releasable, frictional locking engagement with the external surface of drive shaft 42. Thus, drive shaft 42 is directly and positively locked to hollow rotor 62 so as to rotate with the rotor, and shaft 42 may be angularly positioned by direct digital indexing of the motor.

While additional bearings are not necessary, it is preferred to provide one outboard shaft bearing, such as bearing 74, between the outboard end of drive shaft 42 and the outboard end of motor 50. For example, bearing 74 may be retained in an end plate 76 secured to cooling jacket 54 and/or to sleeve 57. It will be understood that, since bearing 44 supports substantially the full weight of roll 29, drive shaft 42 and frameless motor 50, the conventional motor support structure is eliminated, and the only requirement is to provide a means for preventing the motor jacket and stator structure from rotating with the rotor structure. This is easily and simply accomplished by providing a plurality of machine bolts 78, for example, which secure cooling jacket sleeve 57 to bearing housing 23. Alternatively, motor 50 may be secured directly to frame 12 such that, in either mounting arrangement, cooling jacket 54 and stator 58 remain stationary as rotor 62 rotates the directly coupled shaft 42.

As previously stated, shaft 48 is directly coupled to frameless motor 52 in the same manner as just described, and the principal elements are indicated by the same numerals primed. However, it will be noted that eccentric bearing housing 47 is journaled in frame member 12 so as to be able to rotate about off-center axis A and thereby permit adjustment of the spacing between rolls 29 and 30. For this reason, motor sleeve 57' is preferably bolted by bolts 53 to eccentric bearing housing 47 such that the motor rotates with the eccentric bearing housing 47 when the latter is adjusted. Means such as gear teeth 55 are provided over a portion of the outer surface of eccentric housing 47 in order to rotate the latter about axis A; axis B being the rotational axis of the rotor.

With respect to the axial adjustment requirements previously mentioned, the use of frameless or partial motors with the roll drive shafts extending through the rotors as just described enables manual, hydraulic or other types of adjustment systems to be positioned in direct coupling relationship with the shafts. For purposes of example, a manual system 80 is illustrated in connection with die roll 29 and frameless motor 50, while a hydraulic system 95 is illustrated with respect to anvil roll 30 and frameless motor 52.

Manual system 80 comprises a bell-shaped housing 81 which may be solid or formed as a web having 3 or 4 legs 82. Housing 81 or legs 82 are connected to end plate 76 and include a threaded bushing 83 through which a threaded shaft 84 extends. Shaft 84 is rotated by a handwheel 85 and is connected to an inner, bell-shaped housing or web 86 by a ball bearing connector 87.

The opposite end of inner housing 86 is connected to the outboard end of shaft 42 through an annular bearing 88 and annular ring 89, the latter of which is secured to the shaft. Inner housing or web 86 is preferably made hollow in order to support an encoder 90 which is coupled to and driven by shaft 42 through a coupling 91. Inner housing 86 is prevented from rotating by a plurality of radially extending guides 92 which slide in slots in the inner housing.

Rotation of threaded shaft 84 by rotating handwheel 85 moves threaded shaft 84 axially within stationary, threaded bushing 83. Axial movement of threaded shaft 84 axially moves inner bell-shaped housing 86 which, in turn, axially moves and adjusts shaft 42 and roll 29 to the desired axial position. As shaft 42 is adjusted in axial position, the shaft carries with it sleeve 64, rotor 62 and inner bearing races 44a and 74a such that the rotor assembly is axially displaced with respect to the stator. It has been found that the rotor may be axially moved relative to the stator by as much as an inch without significantly decreasing the torque or other performance characteristics of the motor.

The hand-adjustment system just described is well suited to those instances where it is desired to set the axial position of the roll once, and then allow that setting to continue for a significant period of time, such as in the case of the print and die rolls. However, where more frequent axial adjustment is desired, such as the continuous adjustment of the anvil roll, a hydraulic system such as that illustrated at 95 may be employed. Numeral 96 represents the housing of a hydraulic motor which may be entirely conventional, and hence, is not illustrated in detail. Housing 96 may be secured to end plate 76' in any convenient manner, such as for example, by bolting the flange of the housing to end plate 76'. It will be understood that hydraulic motor 96 contains a hydraulically driven piston (not shown) which is connected to the end 98 of shaft 48, and that such piston is controlled in its axial position by a conventional hydraulic controller 99. Thus, shaft 48 is axially adjusted by the hydraulic motor and the shaft, along with its associated rotor 62' and sleeve 64', are moved axially relative to stator 58' in the same manner as previously described with reference to shaft 42 and motor 50 except that controller 99 may be operated to continuously change the position of the hydraulic piston, and hence, continuously change the axial position of anvil roll 30.

Figure 3:
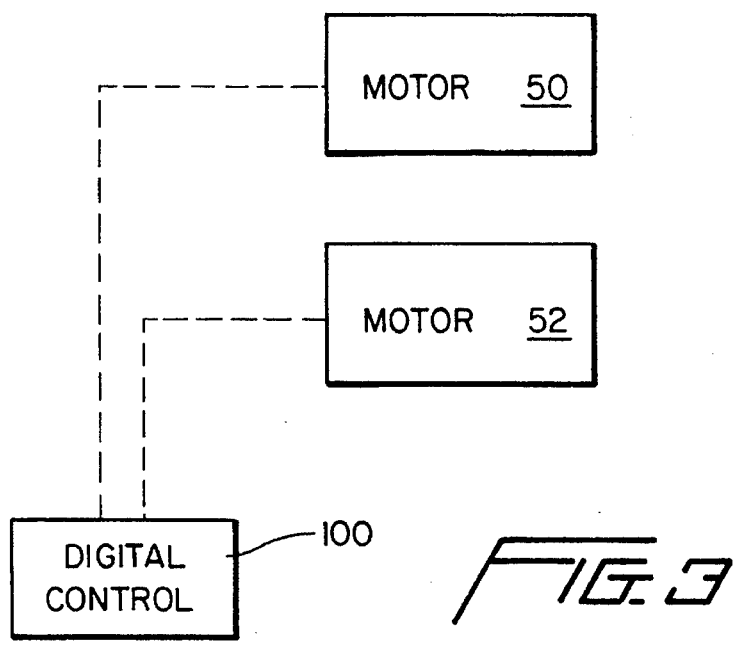
FIG. 3 is a schematic, block diagram illustrating two motors connected through a control system.

Frameless motors suitable for use in the above-described invention are commercially available and may be digitally controlled such that their angular or rotational position can be precisely determined. For example, as illustrated in FIG. 3, frameless motor 52 may be slaved to frameless motor 50 through digital control unit 100 such that the precise angular position and speed of each motor is maintained in the desired relationship without the need for any of the complex and costly gearing previously required.

Figure 4:
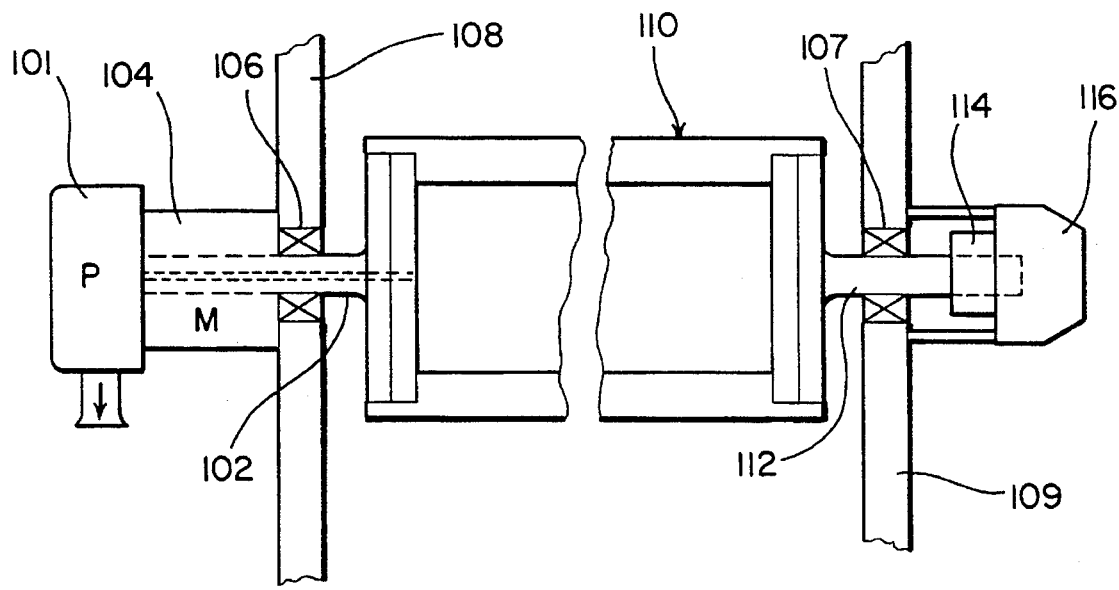
FIGS. 4–6 are schematic, block diagrams illustrating several preferred arrangements of motors and axial adjustment systems mounted on various roll drive shafts

While FIG. 2 illustrates one preferred arrangement with the axial adjustment system and the encoder mounted on the outboard end of the frameless motor, other arrangements are also possible with the present invention. For example, many carton blank processing machines utilize a vacuum system to hold the printing plate on the cylinder of the print roll. As shown in the block diagram of FIG. 4, a vacuum producing pump or compressor 101 may be mounted on the outboard end of a hollow shaft 102 which extends through frameless motor 104. Thus, shaft 102, which extends through bearing 106 in machine frame member 108, may support and drive a print roll 110, and a subatmospheric pressure may be created within the print roll cylinder by the vacuum producing compressor 101 drawing air through hollow shaft 102. On the opposite side of the machine, a second drive shaft 112 extends through a bearing 107 in frame member 109, and an encoder 114 may be mounted on shaft 112 inboard of an axial adjustment system 116 in the manner previously described with reference to FIG. 2.

Figure 5:
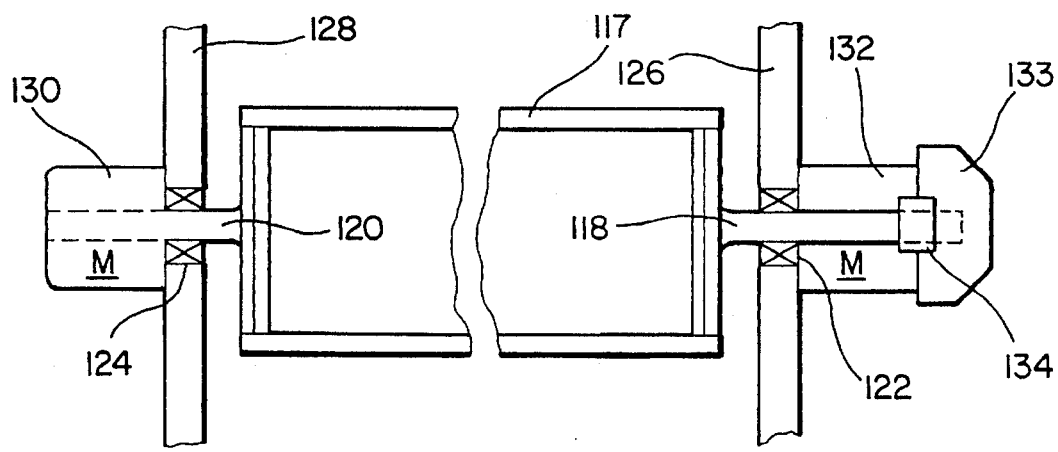

In some instances, such as with extra heavy or extra long rolls, it may not be desirable to apply all of the driving torque to only one drive shaft at one end of the roll as in the previous examples. In such cases, the present invention contemplates the use of two motors to drive the same roll as is illustrated in FIG. 5 with respect to roll 117. Roll 117 is mounted on shafts 118, 120 which extend through bearings 122, 124 in machine frame members 126 and 128. A first motor 130 is mounted on shaft 120 and frame member 128, in the manner previously described, while a second motor 132 is mounted on shaft 118 and frame member 126. In this embodiment, torque may be supplied to the roll through each of drive shafts 118 and 120 in a precisely controlled manner by the digital indexing of the two motors and problems caused by torsional twisting of the roll and/or shafts is eliminated.

As further shown in FIG. 5, an encoder 134 and an axial adjustment system 133 may be mounted on one shaft, such as shaft 118, or one of such units may be mounted on shaft 118 and the other unit may be mounted on the other shaft 120.

Figure 6:
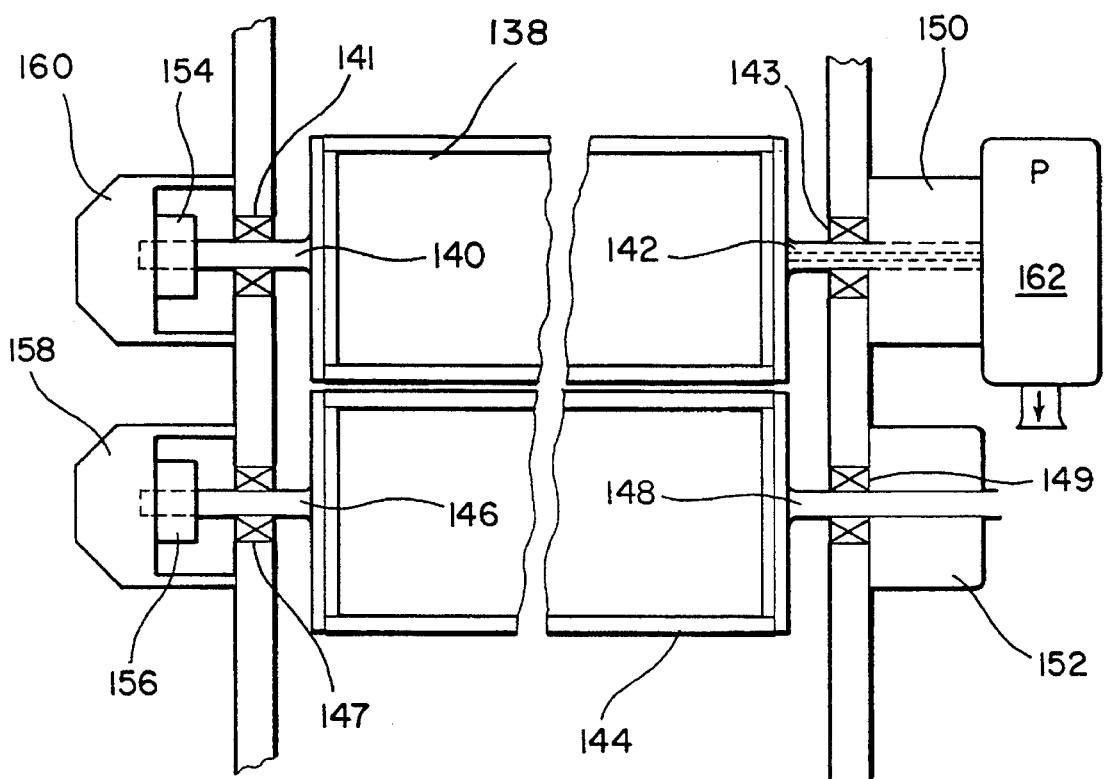

Numerous other arrangements are also possible with the present invention as illustrated, for example, with reference to FIG. 6 which illustrates a particularly preferred embodiment. In this embodiment, a die cylinder 138 is mounted on shafts 140, 142 while an anvil cylinder 144 is mounted on shafts 146 and 148; shafts 140, 142, 146 and 148 being journaled in bearings 141, 143, 147 and 149, respectively. A first motor 150, preferably of the frameless type, is mounted on shaft 142 to drive die cylinder 138, and a second motor 152, also preferably of the frameless type, is mounted on shaft 148 to drive anvil cylinder 144 in the manner as previously described with reference to FIG. 2. However, instead of mounting the encoder and axial adjustment systems outboard of the motors, these units may be mounted on the opposite corresponding shafts 140 and 146 as illustrated by encoders 154 and 156, and axial adjustment systems 158 and 160. This has the advantage of permitting the vacuum/compressor 162 to be mounted outboard of frameless motor 150 as previously described with respect to the FIG. 4 embodiment. Alternatively, if it is desired to have a minimum number of components on the left side of the machine as viewed in FIG. 6, which may be the front of the machine, then the FIG. 6 embodiment enables encoder 156 and axial adjustment system 158 to be mounted on shaft 148 outboard of motor 152 thereby positioning all units, except encoder 154 and axial adjustment system 160, at the rear of the machine.

From the foregoing description of several preferred embodiments of the invention, it will be apparent that the need for expensive and complex gear systems has been eliminated, and the precise angular position of each roll, and its relationship to other rolls, is substantially improved by eliminating the backlash between gears. It will also be noted that, while so-called "frameless" or "partial" motors are preferred for use in the present invention, a conventional motor with a partial casing may be employed so long as it includes a hollow rotor and has at least one axial end sufficiently open; ie, not obstructed by a casing, to allow the roll drive shaft to extend into the rotor. That is, where additional units such as encoders, axial adjustment systems or vacuum pumps are not to be mounted on the outboard end of the motors, such as for example, motor 130 in FIG. 5 or motor 152 in FIG. 6, then only one axial end of the motor must be sufficiently open to receive the drive shaft. On the other hand, where additional units are to be mounted on the outboard end of the motor, as for example in the embodiments of FIGS. 2 and 4, then both axial ends of the motor must be sufficiently open in order to receive the shaft at one end and the axial adjustment system or vacuum pump at the other end. Thus, frameless motors having only an axially extending sleeve or partial casing, and having both axial ends open as illustrated in FIG. 2 are preferred.

It will also be apparent to those skilled in this art that many variations are possible based upon the principles of the present invention. Therefore, it is to be understood that the foregoing description is intended to be purely illustrative rather than limiting of the invention, and that the invention is not to be limited other than as set forth in the following claims and the legal equivalents thereof.

What is claimed is:

1. A carton blank processing machine for processing a plurality of individual carton blanks in series comprising:
    (a) a pair of spaced-apart, vertically extending frame members,
    (b) a pair of bearings located in said frame members,
    (c) a carton blank processing roll extending horizontally between said spaced-apart frame members, said processing roll having opposite ends positioned adjacent said frame members, said processing roll having a hollow interior,
    (d) said processing roll having first and second drive shafts connected to opposite ends of said processing roll, said first drive shaft being a hollow drive shaft;
    (e) said drive shafts extending into said bearings and at least said hollow drive shaft extending through said bearing and extending outboard of said frame member,
    (f) a frameless motor surrounding said hollow drive shaft outboard of said frame member,
    (g) said frameless motor including a stator, a hollow rotor and said hollow drive shaft extending into said hollow rotor,
    (h) connecting means directly connecting said hollow shaft to said hollow rotor for direct rotation of said hollow drive shaft and said hollow carton blank processing roll by said frameless motor, and (i) a vacuum pump mounted outboard of said frameless motor for drawing a partial vacuum on the hollow interior of said processing roll through said hollow drive shaft and hollow rotor.

2. The carton blank processing machine of claim 1 wherein said processing roll is a print roll, said print roll having a printing plate secured to said print roll by said partial vacuum in the hollow interior of said roll.

3. The carton blank processing machine of claim 1 wherein said second drive shaft extends through and outboard of its respective bearing, an axial adjustment system mounted on said second drive shaft outboard of said respective bearing, and coupling means connecting said second drive shaft to said axial adjustment system to vary the axial position of said drive shaft and said rotor relative to said stator and thereby adjust the axial position of said processing roll.

4. The carton blank processing machine of claim 1 wherein both of said drive shafts extend outboard of said frame members, and a frameless motor surrounding each of said drive shafts outboard of said frame members.

5. The carton blank processing machine of claim 1 including a second processing roller, said second processing roller extending parallel to and spaced from said first-recited processing roller for passing carton blanks therebetween, said second processing roller having first and second drive shafts connected to opposite ends of said second processing roller, said first and second drive shafts of said second processing roller extending outboard of said frame members, one of said drive shafts of each of said processing rollers having a frameless motor mounted thereon outboard of said frame members, and the other of said drive shafts of each of said processing rollers having axial adjustment systems mounted thereon outboard of said frame members.

6. The carton blank processing machine of claim 5 wherein said first processing roll is a print roll and said second processing roll is an impression roll.

7. The carton blank processing machine of claim 5 wherein said first processing roll is a die cut roll and said second processing roll is an anvil roll.

8. A machine for processing a plurality of carton blanks in series comprising in combination:

(a) a pair of spaced-apart, vertically extending frame members;

(b) a pair of bearings located in said frame members;

(c) at least one carton blank processing roll extending horizontally between said spaced-apart frame members; said processing roll being hollow and having opposite ends positioned adjacent said frame members;

(d) said processing roll having first and second drive shafts connected to opposite ends of said processing roll;

(e) said drive shafts extending into said bearings, and said first drive shaft being hollow and extending through its respective bearing and extending outboard of said frame member;

(f) a frameless motor surrounding said first drive shaft outboard of said frame member;

(g) said frameless motor including a stator and a hollow rotor, said first drive shaft extending into said hollow rotor;

(h) connecting means directly connecting said first drive shaft to said hollow rotor for direct rotation of said first drive shaft and said carton blank processing roll by said frameless motor;

(i) pumping means mounted outboard of said frameless motor for drawing a partial vacuum in said hollow processing roll through said first hollow drive shaft and said hollow rotor; and (j) axial adjustment means mounted outboard of said second drive shaft for varying the axial position of said processing roll and said rotor relative to said stator within said frameless motor.

9. The carton blank processing machine of claim 8 further including a second processing roll, said second processing roll extending parallel to and spaced from said first recited processing roll, said second processing roll having first and second drive shafts extending through said frame members, said first drive shaft of said second processing roll having a frameless motor mounted thereon outboard of said frame member, and said second drive shaft of said second processing roll having an axial adjustment system mounted thereon.

* * * * *